United States Patent
Shanun

(10) Patent No.: US 8,926,869 B2
(45) Date of Patent: Jan. 6, 2015

(54) METHOD AND COMPOSITION FOR RECOATING TONER CARTRIDGE DEVELOPING MEMBER

(75) Inventor: Sagie Shanun, Sherman Oaks, CA (US)

(73) Assignee: Clover Technologies Group, LLC, Ottawa, IL (US)

( * ) Notice: Subject to any disclaimer, the term of this patent is extended or adjusted under 35 U.S.C. 154(b) by 1146 days.

(21) Appl. No.: 11/926,089

(22) Filed: Oct. 28, 2007

(65) Prior Publication Data
US 2009/0110815 A1  Apr. 30, 2009

(51) Int. Cl.
| | |
|---|---|
| H01B 1/00 | (2006.01) |
| H01B 1/04 | (2006.01) |
| H01B 1/06 | (2006.01) |
| H01B 1/12 | (2006.01) |
| H01B 1/24 | (2006.01) |
| B05D 1/12 | (2006.01) |
| C09D 5/03 | (2006.01) |
| C09D 5/24 | (2006.01) |
| G03G 15/08 | (2006.01) |
| C23C 24/00 | (2006.01) |

(52) U.S. Cl.
CPC ............. G03G 15/0894 (2013.01); H01B 1/04 (2013.01); C23C 24/00 (2013.01); C09D 5/03 (2013.01); C09D 5/24 (2013.01); C03G 15/0812 (2013.01); B05D 1/12 (2013.01); H01B 1/24 (2013.01)
USPC ........... 252/511; 252/500; 252/502; 252/510; 427/180

(58) Field of Classification Search
USPC ........................................ 427/430.1; 252/500
See application file for complete search history.

(56) References Cited

U.S. PATENT DOCUMENTS

| | | | | |
|---|---|---|---|---|
| 3,879,627 | A | * | 4/1975 | Robinder ................... 313/112 |
| 4,383,010 | A | * | 5/1983 | Spaepen .................... 429/517 |
| 4,888,135 | A | | 12/1989 | Tsunaga et al. |
| 5,098,771 | A | * | 3/1992 | Friend ....................... 428/209 |
| 5,155,910 | A | | 10/1992 | Henseler |
| 6,341,420 | B1 | | 1/2002 | Swartz |
| 6,577,830 | B1 | | 6/2003 | Wazana |
| 7,177,565 | B1 | | 2/2007 | Miller |
| 2005/0112288 | A1 | * | 5/2005 | Kinoshita .............. 427/430.1 |
| 2005/0152714 | A1 | | 7/2005 | Lansdown |
| 2006/0090594 | A1 | * | 5/2006 | Fujisawa et al. ............. 75/252 |
| 2007/0019987 | A1 | | 1/2007 | Miller |

FOREIGN PATENT DOCUMENTS

| | | | |
|---|---|---|---|
| DE | 4320069 A1 | | 1/1995 |
| DE | 20307223 | * | 9/2004 |
| DE | 20307223 U1 | | 9/2004 |
| EP | 0043632 A1 | | 1/1982 |
| JP | 06251619 A | | 9/1994 |
| KR | 9208789 | * | 10/1992 |
| WO | 01/20421 A1 | | 3/2001 |

* cited by examiner

Primary Examiner — Harold Pyon
Assistant Examiner — Tanisha Diggs

(57) ABSTRACT

Methods of recoating a developing member such as the doctor blade, developing member bar or a developing sleeve, of an electro-photographic image forming apparatus, such as a laser printer toner cartridge, methods of re-using the original components by re-coating them, to cut the cost of using new aftermarket parts and to reduce waste, which methods include close quality control and "tailoring" of formulations to a specific developing system, thus achieving better print quality in terms of density, page yield, and uniformity for the repaired or remanufactured toner cartridge.

9 Claims, 3 Drawing Sheets

US 8,926,869 B2

METHOD AND COMPOSITION FOR RECOATING TONER CARTRIDGE DEVELOPING MEMBER

FIELD OF INVENTION

The invention relates generally to the field of repair and remanufacture of toner cartridges for laser printers. Specifically, methods of recoating a doctor blade of a laser printer toner cartridge and compositions of electrically conductive coatings are described and claimed herein.

BACKGROUND OF INVENTION

In spent laser printer toner cartridges, the developing components that are worn out or damaged cannot be re-used, as is, because they will not permit the printer to achieve the original print quality criteria. One of the components that traditionally has been replaced in a repair or remanufacture of the toner cartridge is the doctor bar due to wearing off of much of the conductive coating on the OEM doctor bar. In order to achieve the print quality that is expected of a new laser printer toner cartridge, a way of repairing or remanufacturing of the developing components is needed, including recoating these components with a replacement electrically conductive composition.

SUMMARY OF THE INVENTION

This invention relates to a method of recoating a developing member such as the doctor blade, developing member bar or a developing sleeve, of an electro-photographic image forming apparatus, such as a laser printer toner cartridge. This invention also relates to a method of re-using the original components by re-coating them, thus, cutting the cost of using new aftermarket parts and reducing waste. The process also allows close quality control and "tailoring" of formulations to a specific developing system, thus achieving better print quality in terms of density, page yield, and uniformity.

A semi conductive dry coating applied to the surface of a developing member such as developing sleeves, or doctor bars. The recoating process allows a consistent density and uniformity on the printed page over the life of the cartridge. Also, this re-coating reduces the chance of toner or other particulate matter sticking or fusing to the surface of the component, which can cause a print defect on the printed page. The process includes removing the remains of the old coating by a physical means such as sand blasting, or by a chemical means such as etching. Once the surface is clean and prepared, the conductive coating is applied by spraying the coating on the doctor bar and the heat curing.

A semi-conductive, dry coating is applied to the surface of a developing member such as a developing sleeve, or a doctor bar. The recoating process permits a consistent density and uniformity of toner to be deposited on the printed page over the life of the repaired or remanufactured cartridge. Also, this coating reduces the chance of toner or other particulate matter sticking or fusing to the surface of the component, which can cause a print defect on the printed page. The process includes removing the remains of the old coating by a physical means such as sand blasting, or by a chemical means such as etching. Once the surface is clean and prepared, the coating is applied by spraying the component with the dry coating and heat curing the part.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein. Reference symbols common to more than one Figure indicate like components, aspects or features shown therein.

DETAILED DESCRIPTION

Figure 1A:
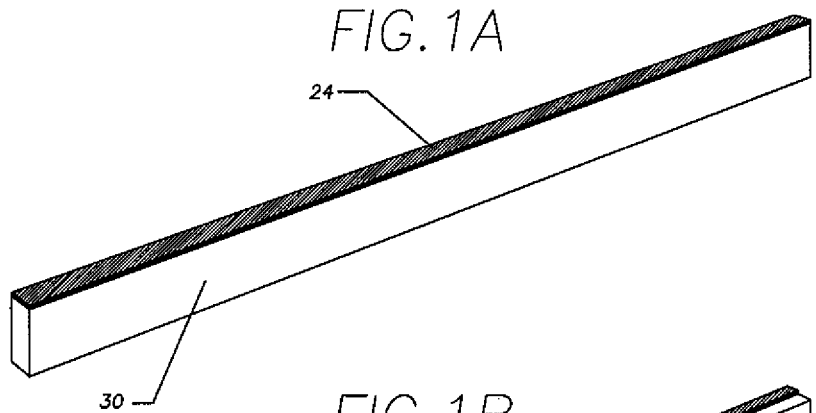
FIG. 1A is a perspective view of a convention, new doctor bar.
Figure 1B:
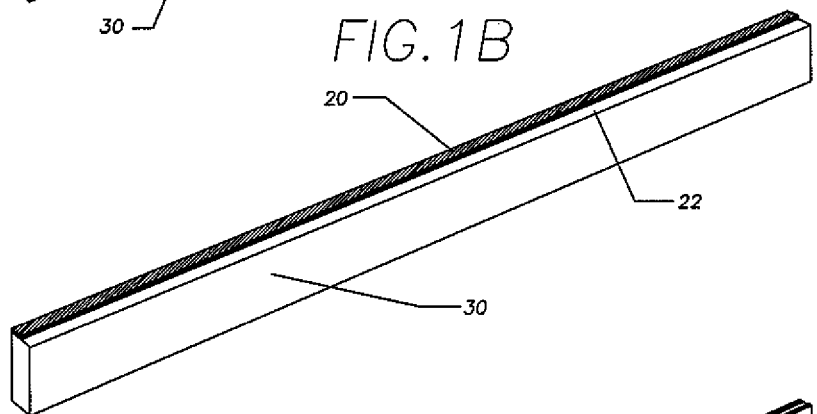
FIG. 1B is a perspective view of a worn, conventional doctor bar having an exemplary pattern of wear on the edge of the bar.
Figure 1C:
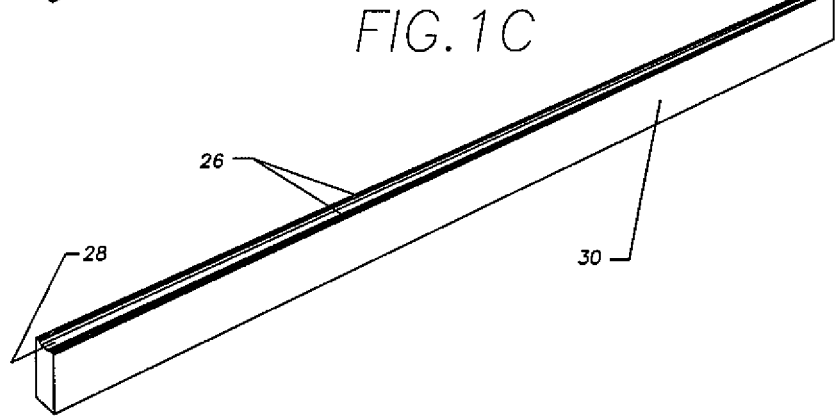
FIG. 1C is a perspective view of a worn, conventional doctor bar having an exemplary pattern of wear on the center of the bar.

In accordance with embodiments of the present invention spent or damaged laser printer toner cartridges typically have doctor bars that are worn out, or at least have significant wearing down of the original surface coating. Referring to FIGS. 1A, 1B and 1C doctor bars 30 are shown. FIG. 1A shows a doctor bar 30 with no sign of wear on its working surface, at 24, i.e., what a new or essentially new doctor bar would look like in a new, OEM condition. Referring to FIG. 1B, the doctor bar 30 has a coating worn off on one side of the bar, shown at 22. Coating on the FIG. 1 doctor bar remains only on the opposite side, shown at 20. At location 22 the coating has been completely worn off, down to the bare metal. Residual coating is shown at 20 on the doctor bar 30 of FIG. 1B. Shown in FIG. 1C is doctor bar 30 having a pattern of coating wear that is different than that shown in FIG. 1B. In FIG. 1C residual coating is shown at areas marked with a 26, i.e., at both the front and rear edges of the doctor bar. The coating that has worn off of the doctor bar in FIG. 1C is along the center of the doctor bar and is shown at 28.

Figure 2A:
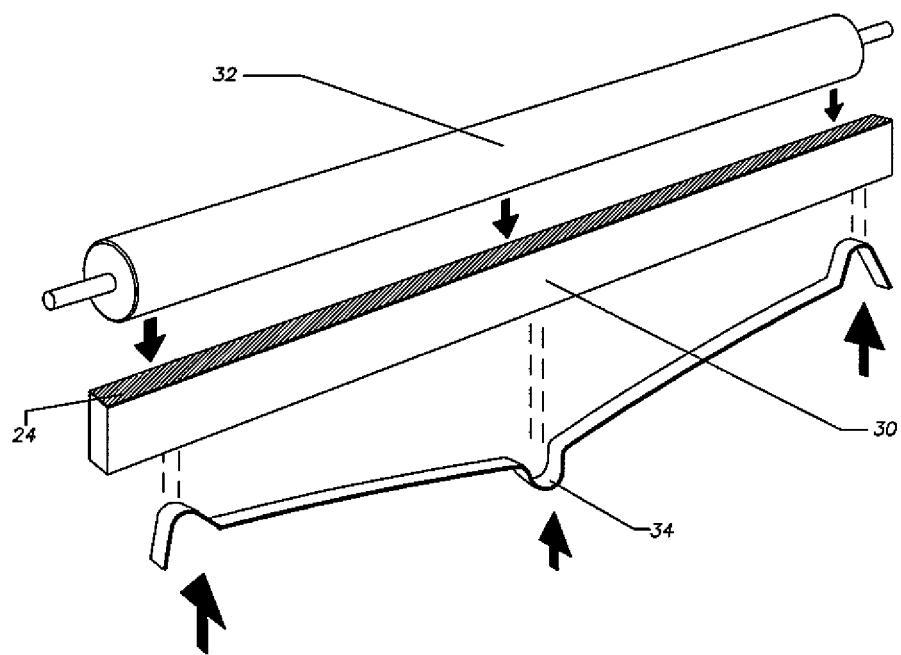
FIG. 2A is an exploded, perspective view of a doctor blade and related components that effect wearing on the conductive coating during use.
Figure 2B:
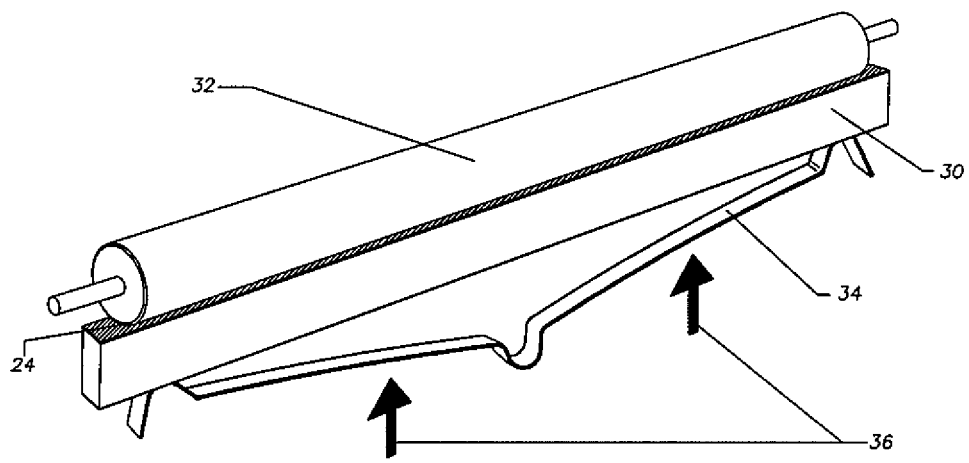
FIG. 2B is an assembly view of the FIG. 2A doctor blade and related components; and, FIG. 3 is a view of a preferred method of removing conductive coating remaining on a spent toner cartridge doctor bar.

Referring to FIG. 2A, an exploded, perspective view of a doctor bar and the laser printer components that operate to cause wear on the doctor bar coating during printer operation is shown. As shown there the coating 24 wears off due to contact with the developer roller 32 during operation of and inside of the laser printer. The main components relating to the doctor bar, and to the wear of the coating are illustrated by direct contact of the developer roller 32 to the coating 24 on the doctor bar 30, the spring 34 applying force to the doctor bar 30, and the doctor bar 30 itself. Referring to FIG. 2B, an assembled view of these components, the three main components that contribute to the wear of the doctor bar coating are shown, as they would appear during operation.

The upper illustration, FIG. 2A, shows the three parts separated for clarity. The spring 34 located directly below the developing member bar will apply an upward force to the doctor bar. The amount of spring force, shown at and in the direction of arrows 36 is what directly correlates the amount of toner that will be metered by the cartridge when applying it to the paper during the printing operation. The purpose of the doctor bar is to meter the amount of toner that is applied to the surface of the developer roller, which will then be transferred to the OPC (photo sensitive member) inside of the laser toner cartridge, and then to the paper from inside the laser printer.

The doctor bars shown and described herein contain semiconductive coatings that contribute to achieving a consistent print quality over the life of the cartridge. In general, the coating on a doctor bar oftentimes will last only for one cycle of a laser printer cartridge. After a single cycle the coating on the doctor bar will be worn off, or substantially worn off in any of a variety of patterns, as shown for example in FIGS. 1B and 1C. To properly repair or remanufacture a laser printer toner cartridge, this coating wear problem should be addressed in order that the repaired or remanufactured cartridge to yield good print quality. In this regard, after-market components may be used to replace worn out original components. However, in the present method a specific component is repaired or refurbished rather than replaced with an after-market component, i.e., an after-market doctor bar.

Figure 3:
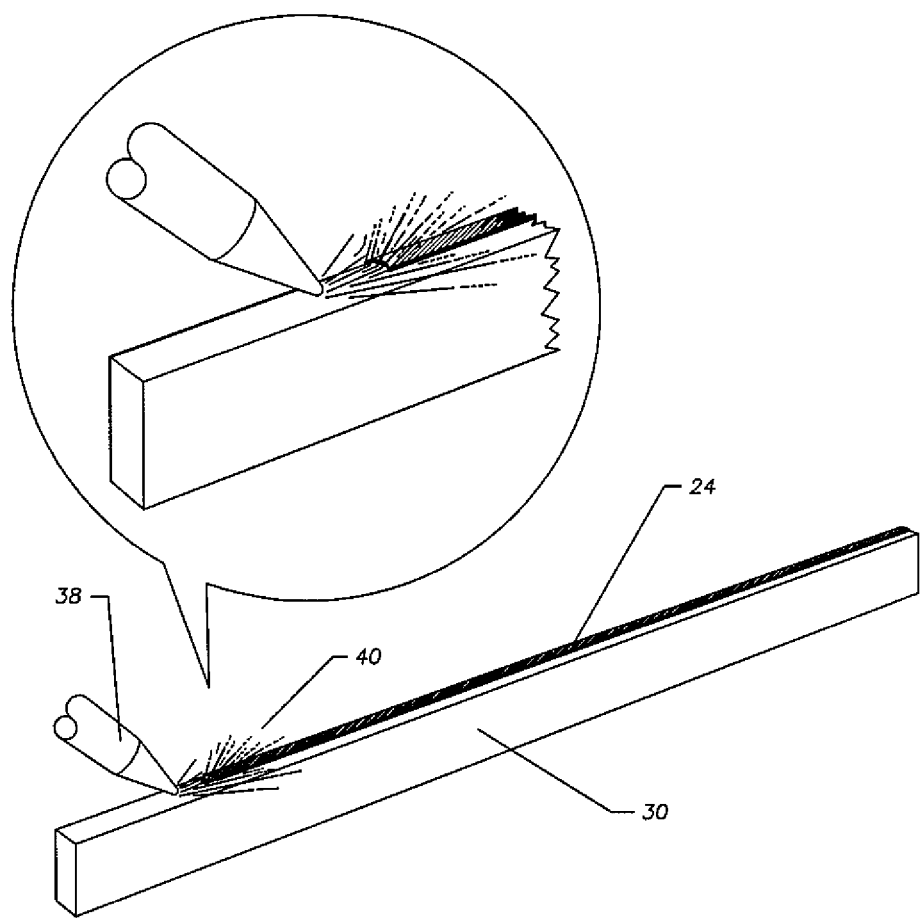

FIG. 3 is a scaled, enhanced drawing of one way of removing the coating from a doctor bar. In this method aluminum oxide or glass beads are blasted, under pressure through a nozzle 38 onto the surface of the used doctor bar. The oxide particles or beads and the removed coating particles are shown at 40. As the nozzle 38 is blasting the coating 24, the combined coating and oxide particles are blown away at 40, thus leaving the doctor bar 30 clean and prepared for the application of a new coating to be applied later. As may be appreciated numerous other methods of removal of the coating may be used. For example, grinding, blasting and scraping processes may be used. Also chemical processes may be used to remove the coating. In a chemical process, a solvent for the coating is chosen, and the used doctor blade is then soaked to break down and strip the coating from the doctor bar.

The preferred recoating process is accomplished in the following steps, although the steps need not be performed in the same order as set forth below Step 1: Stripping Straightening.

In this step the surface of the doctor bar component is stripped of the remains of the original coating. The stripping can be done by means of a physical or chemical method. For example, physical means of removal include using sand paper, high pressure abrasive media air blasting, wet blasting using a water base abrasive slurry, grinding with a grinder lathe having a soft wheel, made of an abrasive material such as "Scotch Brite" brand material, and a buffer or polisher with a relatively soft pad. Chemical removal processes include any method of soaking the bar in a solvent that can remove or etch the surface of the bar so it can be recoated with coating material such that the surface is free of any imperfection. The purpose of this stripping and straightening step is to remove any bumps or notches on the doctor bar. Thus, the surface of the bar is straightened or evened or leveled so that during the coating process, the coated bar will also be even and leveled. Also, a preferable way of accomplishing this step is to make it a two-step process: first, a rough grinding of the surface is accomplished. This first, rough grinding step will decrease the time it takes for sand blasting. Then, in a second step the doctor bar is sand blasted as described above. This combined two-step process results in a reduced time needed to complete the procedure.

Step 2: Surface Preparation.

Once the residual coating has been removed from the doctor blade and it surface has been leveled, surface preparation of the clean doctor bar is accomplished by blasting with an abrasive media-blasting gun. The preferred blasting media is aluminum oxide grit 220, a commercially available commodity. However, the process can be accomplished with other grit sizes such as 400, as well as with different media, such as glass beads. The air pressure used is preferably in the range of 30-60 psi. The specific air pressure needed to properly prepare the surface depends on the type of abrasive media-blasting gun used, the travel speed, and the distance from the doctor bar. With the above-mentioned parameters, the most preferred, or optimal pressure is 40-50 psi. The abrasive media-blasting gun is preferably a top feed type, with internal agitation, in order to achieve a more consistent flow. A bottom feed gun can also be used. Alternatively, a bottom feed gun is preferably used when bigger quantities of sand blasting media are desired. Also, a bottom feed gun can have a separately agitated container that can save the time that otherwise would be required to manually agitate a top feed gun. Also, it has been observed that when the doctor bar is electrically grounded, sand blasting is more efficient than when the bar is not grounded. Specifically, the quality of the sand blasting is higher and the speed of the sand blasting is faster when the bar is grounded during the sand blasting process.

Step 3: Cleaning and Degreasing.

Cleaning and degreasing can be accomplished in any of a number of ways and with a number of chemicals. For example, acetone, MEK, iso-propyl-alcohol, xylene, other alcohols, and highly volatile glycols may be used. The actual cleaning can be by jet pressure, manual or mechanical scrubbing, or by any other means to apply the solvent to the doctor bar. Ultrasonic cleaning machines can also be used. The purpose of this step is to remove the sandblasting media residues, greases and oils on the surface. Thus, virtually any process that accomplishes this purpose can be used for the cleaning and degreasing step.

Step 4: Re-Coating.

Re-coating is preferably accomplished by means of a powder media-spraying gun. The coating is being applied from a powder-media spraying container. The air pressure used is preferably in the range of 30-60 psi. Depending on the type of powder spraying gun being used, the travel speed and distance from the doctor bar, the air pressure most preferably is at 40-50 PSI. The preferred powder-media spraying gun is a top feed with internal agitation in order to achieve a more consistent flow. Alternatively a bottom feed gun with agitation of the spraying media can be used. Also, it has been discovered that when the doctor bar is electrically grounded, the efficiency of sand blasting is higher and faster for better results overall. Air spraying a dry, soft, fine powder onto the already rough cleaned surface, causes the powder to stick and fill the pores on the surface. Because the media is sprayed onto the rough surface of the doctor bar the thickness of the coating is dictated by the porosity of the surface of the bar and any excess powder will spontaneously fall off. Thus for a specific surface roughness the same coating thickness will be achieved every time.

Step 5: Curing.

Curing of the re-coated doctor bars is accomplished by putting them in a curing oven, set at a temperature in the range 350-4200° F. The preferred range of temperatures is 375-400° F. The bars are cured for about 15-25 minutes, preferably about 20 minutes. The specific temperature and time that are optimum will depend on the specific formulation of the coating used.

Formulation and Preparation:

The preferred formula for the re-coating includes two major components: binder powder and conductive powder. The preferred conductive powder is either a carbon powder or graphite powder. The preferred binding powder can be any of a number of resins or combinations of resins. For example, urethane resins, epoxy resins, nylon resins and polyester resins may be used. The specific resin chosen depends on factors such as the specific application, and the page yield expectancy. Infrared cured powder resins also can be used as the binding powder. These resins use infrared energy instead of a conventional convection oven to cure and set the powder to the doctor bar.

In the presently preferred process, both urethane and epoxy base, clear powder-coating resins Rohm and Hass have yielded excellent results. The preferred conductive carbon powders have a mean particle size of 17 microns, and preferred graphite powder also has a mean particle size of 17 microns. These powders are commercially available from Asbury Graphite, or Cabot Corporation. The powder mixture is prepared by agitating the two components together in a ball mill preferably for not less than 4 hours and up to 18 hours. The number of hours of mixing depends on the volume prepared, with greater volumes requiring longer mixing times in the same mixer. Aluminum oxide beads of nominal 10 mm diameter were used as milling media.

The mix ratio for the most preferred formulation has been 30:70, graphite to binder. The mix ratio can go up to 70:30, graphite to binder. The ratio depends on the desired density and page yield, the binder, and conductive powder. Generally speaking, a higher binding powder ratio in the formula, a better adhesion of the coating to the substrate, thus better life expectancy of the coating is obtained. On the other hand, the higher the conductive powder ratio, a higher optical density will be obtained. Higher optical density for the same developing system (toner, developer roller and doctor bar, photosensitive member) and the same toner load, a lower page yield is obtained, since more toner is being applied on the media. Therefore for each application the ration of binding powder to conductive powder can be tailored in order to achieve the desired printing requirements: for example a high density low yield, medium density medium yield or a low density high yield system.

EXAMPLE 1

High Density—Low Yield Formula Coating

In Example 1, 100 parts of graphite powder 8485, from Asbury Graphite, was mixed with 60 parts of clear epoxy powder coat 13-9028, "Corvel Clear" brand available from Rohm and Haas. Mixing took place in a ball mill for 10 hours using 10 mm Aluminum oxide spheres as grinding media. The coating was applied to a cleaned and leveled doctor bar with an airbrush spray gun, from Daasche, at a pressure of 50 psi. This formula gives an optical density of 1.5. The optical density was measured using a hand held, density measurement device commercially available from X-rite. The optical density is a measure of the amount of light reflected from the measured medium in relation to the amount of light transmitted to the medium.

EXAMPLE 2

Medium Density Medium Yield Formula Re-Coating Formula

In Example 2, 100 parts of graphite powder 8485, from Asbury Graphite, was mixed with 90 parts of clear epoxy powder coat 13-9028 "Corvel Clear" brand, from Rohm and Haas. The powders were mixed in a ball mill for 10 hours using 10 mm Aluminum oxide spheres as grinding media. The re-coating mixture was applied to a cleaned and leveled doctor blade with an airbrush spray gun, from Daasche, at a pressure of 50 psi. This formula yielded an optical density of 1.4 (solid area density).

EXAMPLE 3

Low Density High Yield Formula Re-coating Powder

In Example 3, 80 parts of graphite powder 8485, from Asbury Graphite, was mixed with 100 parts of clear epoxy powder coat 13-9028 "Corvel Clear" brand, from Rohm and Haas. The powders were mixed in a ball mill for 10 hours using 10 mm Aluminum oxide spheres as grinding media. The mixture was applied to a cleaned, leveled doctor bar with an airbrush spray gun, from Daasche, at a pressure of 50 psi. This formula yielded an optical density of 1.35 (solid area density).

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made to the system and process without departing from the broader spirit and scope of the invention as set forth in the claims.

What is claimed is:

1. A method for recoating a spent laser printer toner cartridge doctor bar comprising:
    providing a spent laser printer toner cartridge doctor bar having some original conductive coating, bumps and/or notches on its surface;
    removing substantially all bumps and notches from the surface;
    stripping from the surface substantially all of the conductive coating remaining on the surface;
    sand blasting the surface;
    removing from the surface sandblasting residue, grease and oils by applying an organic solvent to the surface;
    spray coating the surface with a coating consisting of a mixture of graphite powder and a clear epoxy powder, the mixture having a ratio of 100 parts by weight of graphite powder to 60 parts by weight of clear epoxy powder, to form a re-coated doctor bar; and,
    curing the re-coated doctor bar by placing it in an oven kept at a temperature in the range of 375-420° F. and keeping the doctor bar in the oven for about 15-25 minutes.

2. The method of claim 1, wherein said sand blasting includes blasting with aluminum grit 220.

3. The method of claim 1, wherein said sand blasting is accomplished with a sand blasting gun operated at a pressure in the range of 30-60 psi.

4. The method of claim 1, wherein the organic solvent is selected from the group consisting essentially of acetone, MEK, iso-propyl-alcohol, xylene, other alcohols, and highly volatile glycols.

5. The method of claim 1 wherein spray coating is accomplished by a powder spraying gun.

6. A composition consisting of: a mixture of a graphite powder and a clear epoxy powder, the mixture having a ratio of 100 parts by weight of graphite powder to 60 parts by weight of clear epoxy powder.

7. The composition of claim 6 wherein the composition is for re-coating a laser printer toner cartridge doctor bar.

8. The composition of claim 6 wherein the composition is applied to a laser printer toner cartridge doctor bar.

9. The composition of claim 6 wherein the composition is configured to coat a laser printer toner cartridge doctor bar.

* * * * *

UNITED STATES PATENT AND TRADEMARK OFFICE
CERTIFICATE OF CORRECTION

| | |
|---|---|
| PATENT NO. | : 8,926,869 B2 |
| APPLICATION NO. | : 11/926089 |
| DATED | : January 6, 2015 |
| INVENTOR(S) | : Sagie Shanun |

It is certified that error appears in the above-identified patent and that said Letters Patent is hereby corrected as shown below:

In the Specification

Column 3, line 23, "to" should be changed to --will--.
Column 4, line 66, "350-4200° F" should be changed to --350-420° F--.
Column 5, line 18, "Hass" should be changed to --Haas--; line 42, "ration" should be changed to --ratio--; line 52, delete "Coating".
Column 6, line 3, delete "Re-Coating"; line 4, delete "Formula"; line 19, delete "Re-coating Powder".

Signed and Sealed this
Twenty-fourth Day of February, 2015

Michelle K. Lee
*Deputy Director of the United States Patent and Trademark Office*